United States Patent
O'Brien, III et al.

(10) Patent No.: US 9,037,793 B1
(45) Date of Patent: May 19, 2015

(54) MANAGING DATA STORAGE (75) Inventors: Walter A. O'Brien, III, Westborough, MA (US); Thomas N. Dibb, Rutland, MA (US)

(73) Assignee: EMC Corporation, Hopkinton, MA (US)

( * ) Notice: Subject to any disclaimer, the term of this patent is extended or adjusted under 35 U.S.C. 154(b) by 84 days.

(21) Appl. No.: 13/249,300

(22) Filed: Sep. 30, 2011

(51) Int. Cl.
G06F 3/06 (2006.01)
G06F 11/10 (2006.01)

(52) U.S. Cl.
CPC .......... *G06F 3/0689* (2013.01); *G06F 11/1076* (2013.01); *G06F 3/0614* (2013.01); *G06F 2211/105* (2013.01)

(58) Field of Classification Search
None
See application file for complete search history.

(56) References Cited

U.S. PATENT DOCUMENTS

2002/0156972 A1* 10/2002 McKnight et al. ............ 711/114
2003/0097524 A1* 5/2003 Brant et al. .................. 711/114

* cited by examiner

*Primary Examiner* — Duc Doan
(74) *Attorney, Agent, or Firm* — Krishnendu Gupta; Jason A. Reyes (57) ABSTRACT

A method and a system for use in managing data storage is disclosed. Data storage is managed in a data storage system comprising a first and a second storage processor and a plurality of data storage devices arranged in a RAID configuration, the first and the second storage processor having respective caches configured to mirror each other. A write I/O is received in the data storage system, wherein the write I/O is an operation for updating data storage in the data storage system. Stripe layout in the plurality of data storage devices in the data storage system is established. It is determined whether the write I/O is at least one full stripe write in response to receiving the write I/O and establishing stripe layout. The at least one full stripe write bypasses cache and is delivered to the plurality of data storage devices in the data storage system in response to determining the write I/O is at least one full stripe write.

2 Claims, 6 Drawing Sheets

MANAGING DATA STORAGE

FIELD OF THE INVENTION

The present invention relates to managing data storage.

DESCRIPTION OF THE PRIOR ART

Computer systems may include different resources used by one or more hosts. Resources and hosts in a computer system may be interconnected by one or more communication connections. These resources may include, for example, data storage devices such as those included in the data storage systems manufactured by EMC Corporation. These data storage systems may be coupled to one or more servers or hosts and provide storage services to each host. Multiple data storage systems from one or more different vendors may be connected and may provide common data storage for one or more hosts in a computer system.

The hosts may access data by sending access requests to the one or more storage systems. Some storage systems require that the access requests identify units of data to be accessed using logical volume and block addresses that define where the units of data are stored on the storage system. Such storage systems are known as "block I/O" storage systems. In some block I/O storage systems, the logical volumes presented by the storage system to the host correspond directly to physical storage devices (e.g., disk drives) on the storage system, so that the specification of a logical volume and block address specifies where the data is physically stored within the storage system. In other block I/O storage systems, internal mapping techniques may be employed so that the logical volumes presented by the storage system do not necessarily map in a one-to-one manner to physical storage devices within the storage system. Nevertheless, the specification of a logical volume and a block address used with an intelligent storage system specifies where associated content is logically stored within the storage system, and from the perspective of the host is perceived as specifying where the data is physically stored.

In contrast to block I/O storage systems, some storage systems receive and process access requests that identify a data unit or other content unit (also referenced to as an object) using an object identifier, rather than an address that specifies where the data unit is physically or logically stored in the storage system. Such storage systems are referred to as object addressable storage (OAS) systems. In object addressable storage, a content unit may be identified using its object identifier and the object identifier may be independent of both the physical and logical location(s) at which the content unit is stored (although it is not required to be because in some embodiments the storage system may use the object identifier to inform where a content unit is stored in a storage system). From the perspective of the host accessing a content unit on an OAS system, the object identifier does not control where the content unit is logically (or physically) stored. Thus, in an OAS system, if the physical or logical location at which the unit of content is stored changes, the identifier by which host computer(s) access the unit of content may remain the same.

It is known in the art that data storage systems may utilize a variety of different techniques in connection with write or update operations. For example, block I/O storage systems or OAS systems or other storage systems, such as a file system storage architecture, may use write back caching in connection with the above operations. With write-back caching, the data storage system may temporarily cache data received from a host within its storage cache and destage the cached data at different times onto the physical disk drives. As is known in the art, the cache may be implemented using fast storage media such as RAM (random access memory), dynamic RAM (DRAM), FLASH memory or FLASH drives. The data storage system may utilize a backup or secondary power supply for use in connection with preventing loss of cached data in the event of a power failure. In the event of a power failure, the data storage system may utilize the backup power supply to provide power to the storage processor and physical data storage devices of the data storage system for a short period of time. During this period of time, the storage processor stores the data from its cache to a dedicated area on the storage devices that may be referred to as a "vault" so that the vault includes the cached data which has not yet been destaged onto the physical storage devices.

It should be noted that a data storage system may include multiple storage processors storing data to a same set of storage devices. Each of the storage processors may have its own cache so that cached data for the above operations, as well as possibly other cached data, may be mirrored in the caches of the storage processors. Multiple storage processors may be desirable for use in providing fault tolerance and the like.

SUMMARY OF THE INVENTION

A method and a system for use in managing data storage is disclosed. Data storage is managed in a data storage system comprising a first and a second storage processor and a plurality of data storage devices arranged in a RAID configuration, the first and the second storage processor having respective caches configured to mirror each other. A write I/O is received in the data storage system, wherein the write I/O is an operation for updating data storage in the data storage system. Stripe layout in the plurality of data storage devices in the data storage system is established. It is determined whether the write I/O is at least one full stripe write in response to receiving the write I/O and establishing stripe layout. The at least one full stripe write bypasses cache and is delivered to the plurality of data storage devices in the data storage system in response to determining the write I/O is at least one full stripe write.

BRIEF DESCRIPTION OF THE DRAWINGS

The invention will be more clearly understood from the following description of preferred embodiments thereof which are given by way of example only with reference to the accompanying drawings in which.

DETAILED DESCRIPTION

The invention can be implemented in numerous ways, including as a process, an apparatus, a system, a computer program embodied on a computer readable storage medium, and/or a processor, such as a processor configured to execute instructions stored on and/or provided by a memory coupled to the processor. In this specification, the implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

There is described below a technique for use in managing data storage. The technique is suitable for managing, but not limited to, high bandwidth write requests that optimizes the use of storage processor compute and memory system resources to improve the throughput achievable on the storage processor. It does so by dynamically deciding which I/Os to mirror and which not to mirror between the storage processors.

Conventionally, the prior art techniques nearly always mirrored write data between controllers and performed a later lazy flush using substantial CPU and memory system resources. In other conventional approaches, the techniques never mirrored write data between controllers and limited the size of I/Os that can be performed on the backend.

The dynamic bandwidth optimization can deliver advantages over these approaches. For example, if sequential I/Os are detected, the technique may choose to write cache mirror one write but on the next write, not mirror, but instead perform a single backend write to the drives that combines the previous write data with the current write data to both. This reduces CPU and memory system resources by not mirroring all the data. It also increases the size of the I/Os to the backend.

Figure 1:
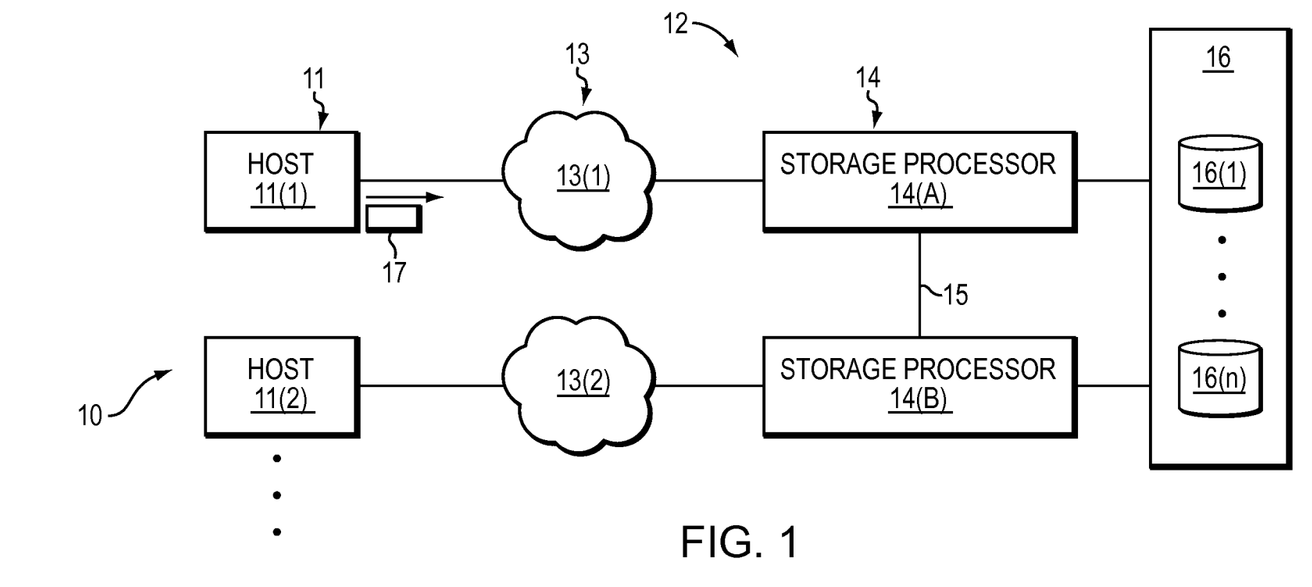
FIG. 1 is a block diagram of a system that may utilize the techniques described herein.

Referring to FIG. 1, there is illustrated an example of an embodiment of a system 10 that may be used in connection with performing the techniques described herein. The system 10 comprises host computers 11(1), 11(2), . . . (collectively, hosts 11) connectable to a data storage system 12 via communications medium 13(1), 13(2), . . . (collectively, communications media 13). The data storage system 12 comprises multiple storage processors 14(A), 14(B) (collectively, storage processors 14), a cache mirror bus 15 and a set of data storage devices, for example, disk drives 16(1), . . . 16(N) (collectively, disk drives 16). For illustration purposes only, the host 11(1) is shown communicating with storage processor 14(A) and the host 11(2) is shown communicating with storage processor 14(B). However, it will be readily apparent to those skilled in the art that this is for illustration purposes and that the host 11(1) may have connections with and communicate with any storage processor 14. It will also be apparent that similar comments also apply to the other host 11(2). The storage processors 14 may be configured to perform data storage operations (e.g., read operations, write operations, etc.) on behalf of the hosts 11. The cache mirror bus 15 may be configured to convey data between caches of the storage processors 14 thus enabling cache mirroring between the storage processors 14. The set of disk drives 16 enables the data storage system 12 to store and retrieve data on behalf of the hosts 11 in a fault tolerant, non-volatile manner (e.g., using a RAID scheme).

Each storage processor 14 may be configured to perform write-back caching in response to write operations 17 from the hosts 11 while both storage processors 14 are in operation. That is the storage processor 14 acknowledges completion of a write operation 17 to the host after the data has been stored in its cache as well as mirrored to the cache of the other storage processor. Such operations enable the data storage system 12 to provide improved response times.

It will be appreciated by those skilled in the art that cache mirroring as described above may be performed over any communication channel between storage processors which may include frontend interfaces, backend interfaces, or some dedicated storage processor to storage processor interfaces. Additionally, it will be appreciated that there may be more than one interface on a storage processor that can be used for cache mirroring and the implementation may distribute mirroring requests across the multiple interfaces based on some load balancing policy. Moreover, it will be appreciated that cache mirroring may be performed over hardwired interfaces like dedicated cables or signals carried over a mid-plane between controllers. Alternatively cache mirror may be performed over networks such as Ethernet, fibre channel, SAS, or PCI networks. Furthermore, it will be appreciated that cache mirroring may be performed between collections of more than two storage processors, with cache data being hosted in two or more storage processors to protect against storage processor failure.

Figure 2:
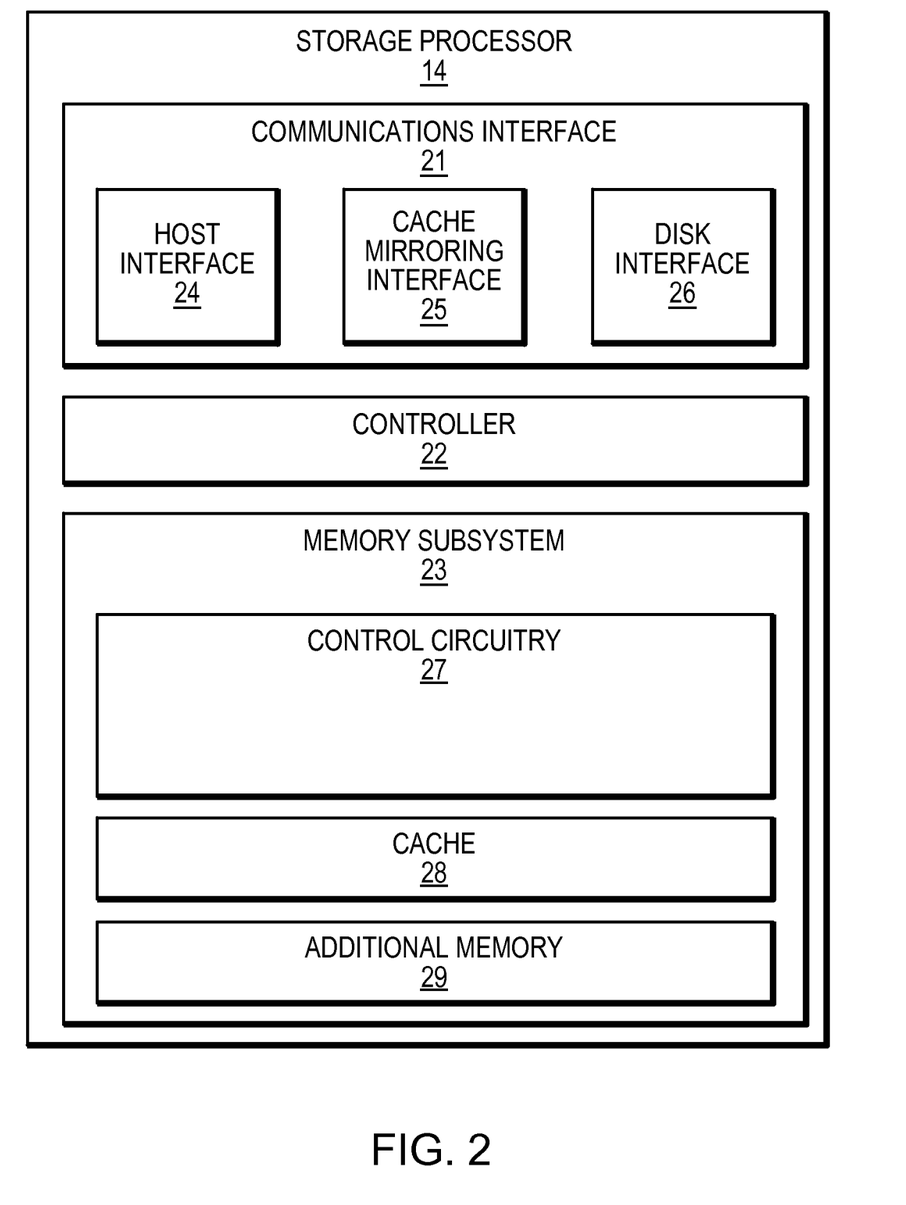
FIG. 2 is a block diagram of components of a system that may utilize the techniques described herein.

Referring to FIG. 2, there is illustrated a block diagram example of a storage processor 14 as illustrated in the data storage system 12 of FIG. 1. The storage processor 14 may include a communications interface 21, a controller 22 and a memory subsystem 23. The communications interface 21 may include a host interface 24, a cache mirroring interface 25, and a disk interface 26. The memory subsystem 23 may include a control circuit 27, cache 28 and additional memory 29. The additional memory 29 includes operating system storage, firmware for storing BIOS and POST code, optional flash memory, etc.

It will be appreciated that the cache 28 may have separate read and write cache memory in the storage processor. Alternatively, it will be appreciated that the cache 28 may be a unified read/write cache with pages of the cache holding cache read data, dirty cached write data, or clean cached write data. The dirty cached write data may be data written by the host that has not yet been written to disk. The clean cached write data may be data written by the host that has been written to disk but is still in the cache. It will also be appreciated that in certain instances the cached read data may not be mirrored between storage processors but cached write data may be mirrored.

The communications interface 21 may be configured to provide connectivity from the storage processor 14 to various other components. In particular, the host interface 24 may be configured to connect the storage processor 14 to one or more hosts 11 through the communications media 13. The cache mirroring interface 25 may be configured to connect the storage processor 14 (e.g., the storage processor 14(A)) to another storage processor 14 (e.g., the storage processor 14(B)) to enable cache mirroring through the cache mirror bus 15. The disk interface 26 may be configured to connect the storage processor 14 to the set of disk drives 16.

The controller 22 may be configured to carryout data storage operations on behalf of one or more of the hosts 11 through the communications interface 21 (e.g., the write operations 17 in FIG. 1). In some arrangements, the controller 22 may be implemented as a set of processors running an operating system which is capable of being stored in a designated area on one or more of the disk drives 16. In other arrangements, the controller 22 may be implemented as logic circuitry (e.g., Application Specific Integrated Circuitry, Field Programmable Gate Arrays, etc.), microprocessors or processor chip sets, analog circuitry, various combinations thereof, and so on.

The memory subsystem 23 may be configured to provide memory services to the controller 22. In particular, the control circuitry 27 of the memory subsystem 23 may be configured to provide logic for use with the cache 28 so as to manage the data storage as described herein. It will be appreciated that the control circuit 27 may be further capable of performing other tasks using the additional memory 29 such as vaulting contents of the cache 28 into non-volatile flash memory or disk drive memory in response to a failure of the controller 22 and the like.

Figure 3:
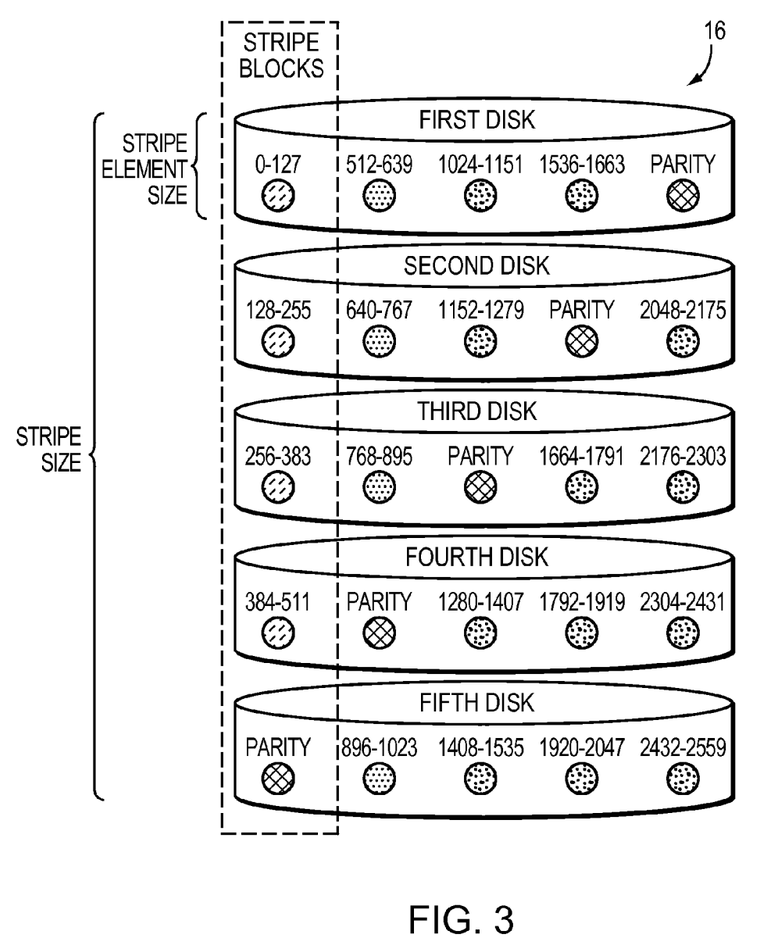
FIG. 3 is a block diagram of components of a system that may utilize the techniques described herein.

Referring to FIG. 3, there is illustrated an example of data storage devices 16 as shown in the system of FIG. 1. In this embodiment, the data storage devices 16 are disk drives arranged in a RAID 5 configuration. It is well known in the art that a RAID 5 configuration uses data striping. It is also known that with a RAID 5 configuration it is possible to create up to thirty two RAID 5 LUNs to apportion disk space to, for example, different users, servers and applications. It is also well known that a data storage system with data storage devices arranged in such a configuration writes parity information that lets the data storage devices in the RAID configuration continue operating if a data storage device fails. In this example, the data from a logical unit is striped across the drives. For example, the first 128 logical blocks (0-127) of the logical unit are written on the first disk, the second 128 logical blocks (128-255) are written to the second drive and so on. In this example, a full stripe of data is present on the data storage system if all of the logical blocks necessary to fill in a full stripe, or column in the diagram, are on the data storage system. For example, the data for logical blocks 0-511 or 1536-2047 would indicate the presence of a full stripe of data.

Figure 4:
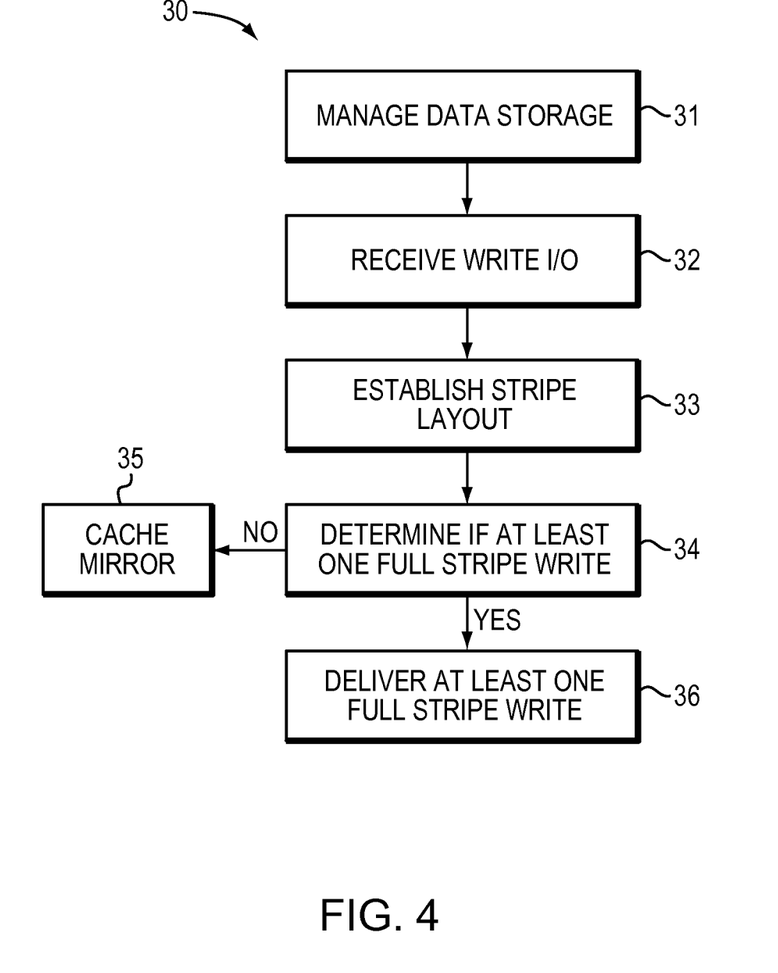
FIG. 4 is a flowchart summarizing the steps for managing data storage.

Referring to FIG. 4, there is illustrated a flowchart summarizing the steps of a technique 30 for managing data storage. It will be appreciated the aforementioned system and example may be configured for performing the technique summarized in the flowchart and described herein. In one embodiment the technique can manage data storage 31 in a data storage system comprising a first and a second storage processor and a plurality of data storage devices arranged in a RAID configuration. The first and second storage processors having cache that are configured to mirror each other. The data storage devices may be disk drives. The above features have all been described in relation to previous figures and similar comments may also apply to the features described hereafter. In one embodiment, the technique can receive 32 a write I/O in the data storage system. For example, the I/O may be received in memory in the data storage system. It will be appreciated by those skilled in the art that a write I/O or write operation is any operation that updates data storage in the data storage system. For example, the write I/O may be the data to be forwarded to the data storage devices in the data storage system. In a further example, the write I/O may initially be a command or request from a host for permission to forward data associated with the write I/O to the data storage system. The data may subsequently be forwarded in response to a reply from the data storage system that it is in order to send the data in connection with the write I/O. In a further example, SCSI commands such as WRITE SAME, EXTENDED COPY and the like may be considered for the purposes of this disclosure as write I/O. In a still further example, file or object systems may have other commands including update commands like TRUNCATE or DELETE that may also for the purposes of this disclosure be considered as write I/O. It will be appreciated that any other update command may also be considered as a write I/O. The technique can establish 33 stripe layout in the plurality of data storage devices arranged in a RAID configuration in the data storage system. For example, the details in relation to the stripe layout may be stored in one or both the storage processors or else ware in the data storage system enabling the technique to establish the layout. Additionally, the technique can determine 34 if the write I/O is at least one full stripe write in response to receiving the write I/O and establishing the stripe layout. If the technique determines the write I/O is not at least one full stripe write the technique may be configured to cache mirror 35 the write. However, if the technique determines the write I/O is at least one full stripe write, the full stripe write can bypass cache and is delivered 36 to the plurality of data storage devices in the data storage system. It will be appreciated by those skilled in the art that delivering a full stripe write to the data storage devices may also include calculating a RAID parity as well as delivering parity to the data storage devices.

An advantage of the technique is that it can dynamically recognize a full stripe write. It has been found that data storage systems operate more efficiently when they selectively deliver a full stripe write to data storage devices and bypass cache mirroring. One of the reasons is the work required to calculate the RAID parity is less than when the data storage system receives a write I/O less than a full stripe write. In a full stripe write it is not necessary to perform any preliminary reads because all the data needed to compute the correct parity data is already available. A further advantage is that by not mirroring all data the memory bandwidth and CPU consumed by write mirroring is reduced leaving more memory bandwidth and CPU for satisfying additional requests.

Figure 5:
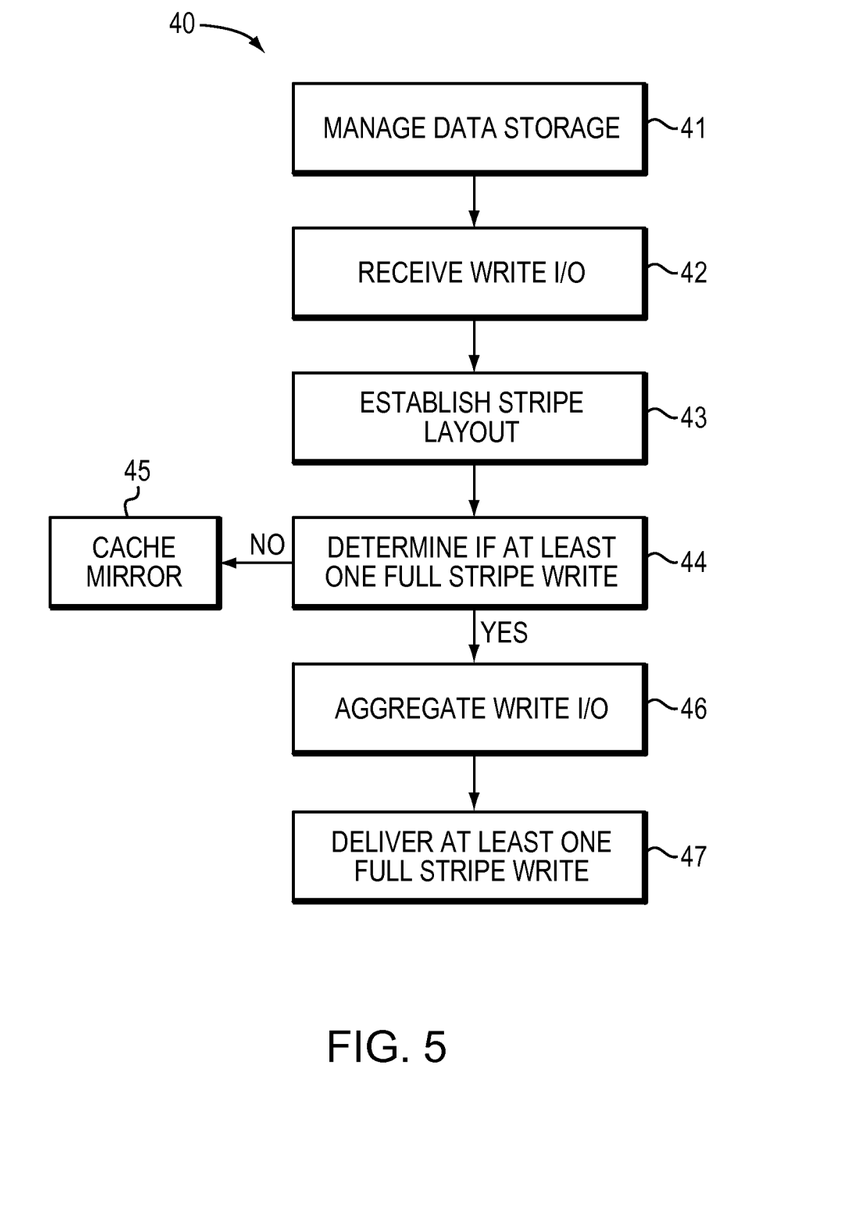
FIG. 5 is a flowchart summarizing the steps for managing data storage.

Referring to FIG. 5, there is illustrated a flowchart summarizing the steps of a technique 40 for managing data storage. It will be appreciated the aforementioned system and example may be configured for performing the technique summarized in the flowchart and described herein. In one embodiment the technique can manage data storage 41 in a data storage system comprising a first and a second storage processor and a plurality of data storage devices arranged in a RAID configuration. The first and second storage processors having cache that are configured to mirror each other. The data storage devices may be disk drives. The above features have all been described in relation to previous figures and similar comments may also apply to the features described hereafter. In one embodiment, the technique can receive 42 a plurality of write I/O substantially simultaneously in the data storage system. For example, the technique can receive a plurality of write I/O written in parallel substantially simultaneously in memory in the data storage system. It will be appreciated by those skilled in the art that a write I/O or write operation is any operation that updates data storage in the data storage system. For example, the write I/O may be the data to be forwarded to the data storage devices in the data storage system. In a further example, the write I/O may initially be a command or request from a host for permission to forward data associated with the write I/O to the data storage system. The data may subsequently be forwarded in response to a reply from the data storage system that it is in order to send the data in connection with the write I/O. In a further example, SCSI commands such as WRITE SAME, EXTENDED COPY and the like may be considered for the purposes of this disclosure as write I/O. In a still further example, file or object systems may have other commands including update commands like TRUNCATE or DELETE that may also for the purposes of this disclosure be considered as write I/O. It will be appreciated that any other update command may also be considered as a write I/O. The technique can establish 43 stripe layout in the plurality of data storage devices arranged in a RAID configuration in the data storage system. For example, the details in relation to the stripe layout may be stored in one or both the storage processors or else ware in the data storage system enabling the technique to establish the layout. Additionally, the technique can determine 44 if the write I/O is at least one full stripe write in response to receiving the write I/O and establishing the stripe layout. If the technique determines the plurality of write I/O do not make up at least one full stripe write the technique may be configured to cache mirror 45 the write I/O. However, if the technique determines that the plurality of write I/O make up at least one full stripe write the technique can aggregate 46 the write I/O to form at least one full stripe write. The technique will bypass cache and deliver 47 the at least one full stripe write to the plurality of data storage devices in the data storage system in response to aggregating the write I/O to form at least one full stripe write. It will be appreciated by those skilled in the art that delivering a full stripe write to the data storage devices may also include calculating a RAID parity as well as delivering parity to the data storage devices.

The above technique has many advantages. For example, an operating system associated with an application executing on a host may not support a large write I/O and may break down the large write into a series of smaller writes. The application executing on the host may, for example, issue a write I/O of 4 MB broken down into sixteen 256 kB write I/Os issued by the operating system in parallel to the data storage system. Conventionally, the data storage system would receive the small write I/Os approximately simultaneously and cache mirror the small write I/Os. However, in accordance with the technique as described herein, the data storage system receives the write I/Os and can dynamically recognize the pattern of write I/Os as a full stripe write. The technique can deliver the full stripe write directly to the data storage devices bypassing the cache in response to determining at least one full stripe write. This reduces CPU and memory system resources by not mirroring. It also increases the size of the I/Os to the backend.

A further advantage is that the storage system can recognize it has 4 MB of data before it mirrors the writes and instead aggregate the 4 MBs of data and write it directly to the disks. With mirrored write caching the 256 KB writes will be written to the cache and acknowledged back to the host as complete. In the background the array will take the 4 MBs of data in the cache and write it to the disks. With mirrored write caching disabled each 256 KB write must be written to disk separately before responding to the host. The advantage of the above technique is that the 4 MBs is recognized before caching and is aggregated and delivered to the data storage devices.

Figure 6:
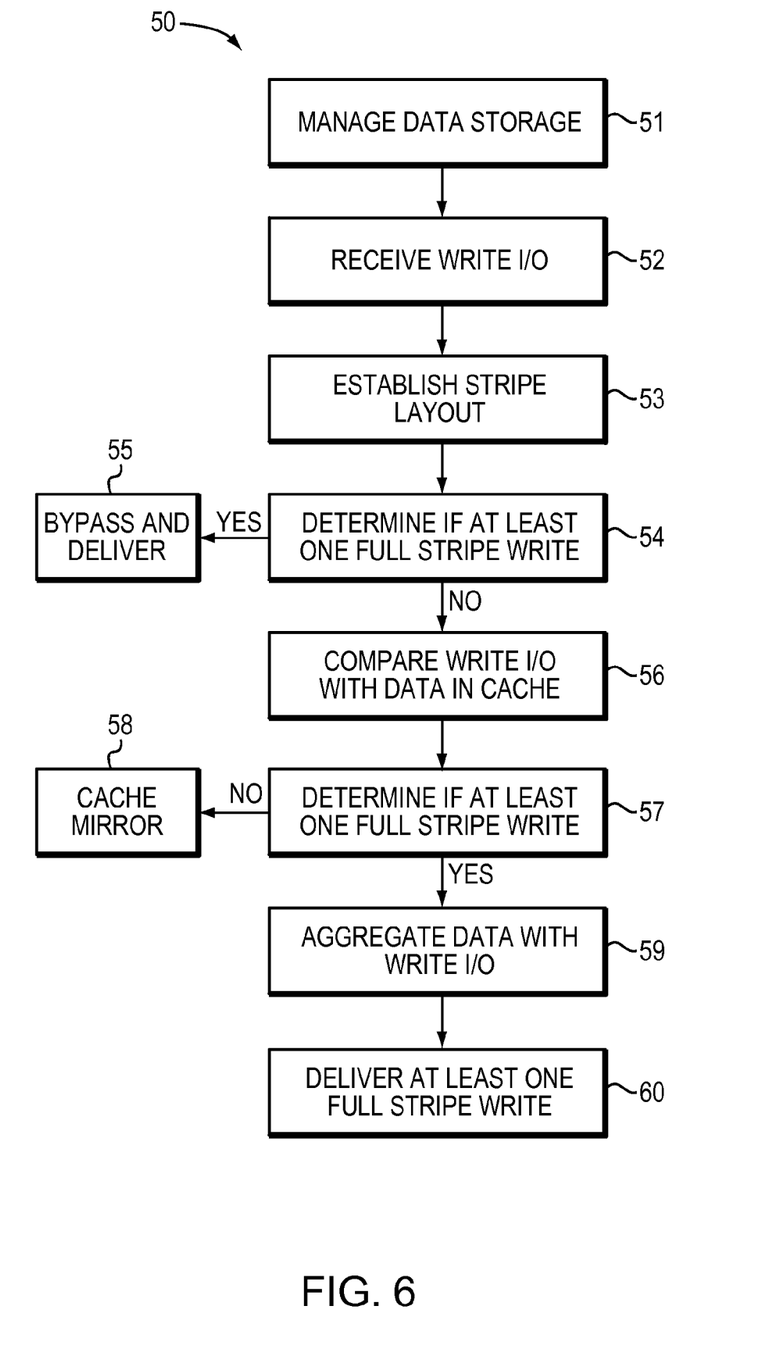
FIG. 6 is a flowchart summarizing the steps for managing data storage.

Referring to FIG. 6, there is illustrated a flowchart summarizing the steps of a technique 50 for managing data storage. It will be appreciated the aforementioned system and example may be configured for performing the technique summarized in the flowchart and described herein. In one embodiment, the technique can manage data storage 51 in a data storage system comprising a first and a second storage processor and a plurality of data storage devices arranged in a RAID configuration. The first and second storage processors having cache that are configured to mirror each other. The data storage devices may be disk drives. The above features have all been described in relation to previous figures and similar comments may also apply to the features described hereafter. In one embodiment, the technique can receive 52 a write I/O in the data storage system. For example, the I/O may be received in memory in the data storage system. It will be appreciated by those skilled in the art that a write I/O or write operation is any operation that updates data storage in the data storage system. For example, the write I/O may be the data to be forwarded to the data storage devices in the data storage system. In a further example, the write I/O may initially be a command or request from a host for permission to forward data associated with the write I/O to the data storage system. The data may subsequently be forwarded in response to a reply from the data storage system that it is in order to send the data in connection with the write I/O. In a further example, SCSI commands such as WRITE SAME, EXTENDED COPY and the like may be considered for the purposes of this disclosure as write I/O. In a still further example, file or object systems may have other commands including update commands like TRUNCATE or DELETE that may also for the purposes of this disclosure be considered as write I/O. It will be appreciated that any other update command may also be considered as a write I/O. The technique can establish 53 stripe layout in the plurality of data storage devices arranged in a RAID configuration in the data storage system. For example, the details in relation to the stripe layout may be stored in one or both the storage processors in the data storage system enabling the technique to establish the layout. Additionally, the technique can determine 54 if the write I/O is at least one full stripe write in response to receiving the write I/O and establishing the stripe layout. If the write I/O is determined to be at least one stripe write then it bypasses cache and is delivered 55 to the data storage devices as described above. However, if the write I/O is not determined to be a full stripe write, the technique can compare 56 the received write I/O with data in cache. Additionally, the technique can determine 57 if at least one full stripe write can be formed by aggregating the received write I/O with data in cache in response to the comparison of the received write I/O and data in cache. If it is determined that there is not one full stripe write by aggregating data in cache with received write I/O then the received write I/O can be cache mirrored 58. If it is determined that there may be formed at least one full stripe write by aggregating received write I/O with at least some data in cache the technique can aggregate 59 at least some data in cache and received write I/O to form the at least one full stripe write. Moreover, the technique can bypass cache and deliver 60 the at least one full stripe write to the plurality of data storage devices in the data storage system. It will be appreciated by those skilled in the art that delivering a full stripe write to the data storage devices may also include calculating a RAID parity as well as delivering parity to the data storage devices.

The advantages of the technique are many. For example, a full stripe write may be composed of n small sequential writes. The data storage system may receive a series of sequential writes and decide to cache (i.e. deliver to cache and mirrored cache) the first n−1 sequential write I/Os. However, the technique can dynamically decide on receiving the final nth sequential write that there is no need to cache and mirror the nth write because it may determine that the first n−1 writes in the cache combined with the nth write may form a full stripe write. The technique may decide that in response to determining a full stripe write, the nth write may bypass caching. In this scenario the nth write may also be aggregated with the n−1 writes to form a full stripe write, a RAID parity may be calculated, and delivered directly to the data storage devices at the backend of the data storage system.

In another embodiment, the technique may be configured to delay caching the received write I/O to establish if a I/O will be received that can be aggregated with received write I/O to form a full stripe write in response to determining that the received write I/O is not a full stripe write. In such a scenario, the first n−1 write may not all be cached as some or all may be delayed to ascertain if further I/O will be received.

While it has been described above that the technique recognizes that the nth write I/O together with the n−1 writes form the full stripe write, it will be apparent to those skilled in the art that the technique may also receive a single write I/O and check the cache for old data to determine if any of the old data together with the new I/O can form a full stripe write. The old data may be read I/O or write I/O or a combination of both.

While it has been described that the nth write was not cached it will be readily apparent to those skilled in the art that the technique may be configured to recognize the full stripe write before the nth write I/O is received in the data storage system and to aggregate the n write I/Os as described above.

It will be appreciated that all the above techniques with respect to FIGS. 4 to 6 have been described as including a step for determining if there is at least one full stripe write in response to receiving the write I/O and establishing the stripe layout. It will be apparent to those skilled in the art that the technique may in certain instances determine a full stripe write and a partial stripe in response to receiving the write I/O and establishing the stripe layout. It will also be appreciated that in certain instances it may be determined that there is more than one full stripe write as well as more than one partial stripe. In such a scenario, the technique may deliver the full stripe write or writes to the data storage devices and bypass cache. Moreover, the technique may determine to cache mirror the partial stripe or stripes.

An embodiment may implement the techniques herein using code executed by a computer processor. For example, an embodiment may implement the techniques herein using code which is executed by a processor of the data storage system. As will be appreciated by those skilled in the art, the code may be stored on the data storage system on any one of a computer-readable medium having any one of a variety of different forms including volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a data storage system processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing data storage, the method comprising:
   managing data storage in a data storage system, wherein the data storage system comprises a first and a second storage processor and a plurality of data storage devices arranged in a RAID configuration, the first and the second storage processor having respective caches configured to mirror each other;
   receiving a plurality of write I/O operations for updating data storage in the data storage system;
   establishing stripe layout in the plurality of data storage devices in the data storage system;
   based on the received plurality of write I/O operations and the established stripe layout, determining whether the plurality of write I/O operations comprise logical blocks necessary to form at least one full stripe write;
   in response to determining that the plurality of write I/O operations do not comprise logical blocks necessary to form at least one full stripe write, delaying write-back caching in order to establish if a further write I/O will be received that can be aggregated with received write I/O to form a full stripe write, wherein write-back caching comprises acknowledging completion of a write I/O after data has been stored in the respective caches;
   in response to determining that the plurality of write I/O operations comprise logical blocks necessary to form at least one full stripe write, aggregating the plurality of write I/O operations to form the at least one full stripe write,
   calculating parity in connection with the at least one full stripe write, and
   bypassing cache and delivering the at least one full stripe write and parity to the plurality of data storage devices in the data storage system.

2. A system for use in managing data storage, the system comprising:
   first logic managing data storage in a data storage system, wherein the data storage system comprises a first and a second storage processor and a plurality of data storage devices arranged in a RAID configuration, the first and the second storage processor having respective caches configured to mirror each other;
   second logic receiving a plurality of write I/O operations for updating data storage in the data storage system;
   third logic establishing stripe layout in the plurality of data storage devices in the data storage system;
   based on the received plurality of write I/O operations and the established stripe layout, fourth logic determining whether the plurality of write I/O operations comprise logical blocks necessary to form at least one full stripe write;
   in response to determining that the plurality of write I/O operations do not comprise logical blocks necessary to form at least one full stripe write, fifth logic delaying write-back caching in order to establish if a further write I/O will be received that can be aggregated with received write I/O to form a full stripe write, wherein write-back caching comprises acknowledging completion of a write I/O after data has been stored in the respective caches;

in response to determining that the plurality of write I/O operations comprise logical blocks necessary to form at least one full stripe write, sixth logic aggregating the plurality of write I/O operations to form the at least one full stripe write, calculating parity in connection with the at least one full stripe write, and bypassing cache and delivering the at least one full stripe write and parity to the plurality of data storage devices in the data storage system.

* * * * *